United States Patent [19]
Ettischer et al.

[11] 3,768,389
[45] Oct. 30, 1973

[54] TRANSPORT METERING AND SHUTTER COCKING MECHANISM FOR CAMERAS

[75] Inventors: Helmut Ettischer; Wolfgang Ort; Horst Simon; Kurt Steisslinger, all of Stuttgart Wangen, Germany

[73] Assignee: Eastman Kodak Company, Rochester, N.Y.

[22] Filed: May 30, 1972

[21] Appl. No.: 258,076

[30] Foreign Application Priority Data
Aug. 24, 1971 Germany.................. P 21 42 277.5

[52] U.S. Cl............ 95/31 AC, 95/31 FM, 95/31 FL
[51] Int. Cl......................... G03b 9/68, G03b 19/04
[58] Field of Search ..................... 95/31 AC, 31 FL, 95/31 FM

[56] References Cited
UNITED STATES PATENTS
2,629,302   2/1953   Mihalyi ........................... 95/31 AC Primary Examiner—Robert P. Greiner
Attorney—W. H. J. Kline et al.

[57] ABSTRACT

A camera for perforated roll film includes a transport mechanism for advancing film along an exposure plane, a metering mechanism for selectively disabling the transport mechanism and a film sensing pawl movable from a retracted state on one side of the exposure plane to an extended state transversing the exposure plane when intercepting one of the film perforations. Movement of the film along the exposure plane moves the sensing pawl to a position allowing the metering mechanism to disable the transport mechanism. After exposure, a film advance member may be moved to first withdraw the sensing pawl from the perforation and cock the camera's shutter mechanism and then to activate the transport mechanism to advance film.

4 Claims, 5 Drawing Figures

TRANSPORT METERING AND SHUTTER COCKING MECHANISM FOR CAMERAS

CROSS-REFERENCE TO RELATED APPLICATIONS

Reference is made to commonly assigned, copending U.S. Pat. applications Ser. No. 203,733, entitled CAMERA, filed in the names of David E. Beach and Jeffrey R. Stoneham on Dec. 1, 1971, and Ser. No. 203,524, entitled FILM METERING MECHANISM FOR CAMERAS, filed in the name of David E. Beach on Dec. 1, 1971.

BACKGROUND OF THE INVENTION

1. Field of the Invention

The present invention relates to devices for metering film in a roll film camera, and more particularly to such devices for sensing the presence of a film perforation and for selectively locking and releasing the film transport mechanism when a perforation is detected at a predetermined position along the camera exposure plane.

2. Description of the Prior Art

The present invention is an improvement over the invention disclosed in commonly assigned, copending U.S. Pat. application Ser. No. 203,733, entitled CAMERA, filed in the names of David E. Beach and Jeffrey R. Stoneham on Dec. 1, 1971. The camera disclosed in that application includes a film metering pawl movable into locking engagement with the film transport mechanism when a film sensing pawl detects the presence of a film perforation at a predetermined position along the camera exposure plane. The sensing pawl is removed from the perforation by the camera's shutter release level so as not to interfere with subsequent film transport, the operator being required to depress the camera's shutter release button with sufficient force to overcome the force of a spring urging the sensing pawl into the film's perforation. While this type of mechanism for withdrawing the sensing pawl from the film perforations has been used in many cameras known in the prior art, the added force required to depress the shutter release button may result in blurred pictures caused by camera movement during exposure. This problem may be aggravated where long exposure periods are required and/or in cameras of small size and mass such as those adapted to receive size 110 film cartridges.

In his coassigned U.S. Pat. No. 3,186,322 which issued June 1, 1965 and U.S. application Ser. No. 203,524 entitled, FILM METERING MECHANISM FOR CAMERAS, filed Dec. 1, 1971, David E. Beach disclosed camera mechanism wherein the film sensing pawl remains in a film perforation during exposure and is cammed out of the perforation by the trailing edge of the film perforation as the film is advanced to the next succeeding film frame. By removing the sensing pawl from the perforation in this manner, camera steadiness during the exposure period is improved. However, since the film itself is used to move the sensing pawl from the perforation, the film may be subjected to an unusual force from the pawl causing distortion or tearing of the film in the region of the perforation. Should this occur, free passage of the film into the take-up chamber of the film cartridge may be hampered; thereby resulting in a blockage of the film transport mechanism.

SUMMARY OF THE INVENTION

It is an object of the present invention to provide a camera having improved film advance and metering mechanism.

It is a further object of the present invention to provide a camera of the type having a film sensing pawl for detecting the presence of a film perforation, with means for removing the pawl from the perforation before film is advanced. In this manner, the likelihood of damage to the film in the region of the perforation is reduced.

In accordance with this object, a preferred embodiment of the present invention includes a member movable to first cock the camera's shutter and then to advance film along the camera's exposure plane to the next succeeding film frame. Means associated with such member causes the film sensing pawl to be removed from the perforation during the shutter cocking operation and before the film begins to advance.

The invention, and its objects and advantages, will become more apparent in the detailed description of the preferred embodiments presented below.

BRIEF DESCRIPTION OF THE DRAWINGS

In the detailed description of the preferred embodiments of the invention, presented below, reference is made to the accompanying drawings, in which.

DESCRIPTION OF THE PREFERRED EMBODIMENTS

Because cameras are well known, the present description will be directed in particular to elements forming part of, or cooperating more directly with, apparatus in accordance with the present invention. It is to be understood that camera elements not specifically shown or described may take various forms well known to those skilled in the art.

Figures 1, 2:
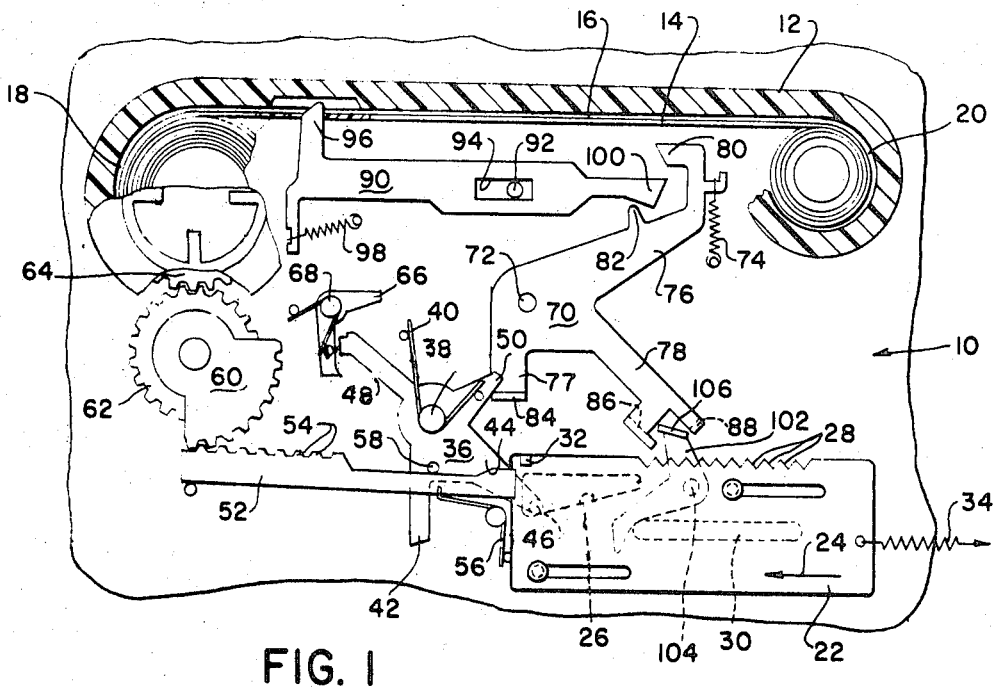
FIG. 1 is a view of a portion of a camera in accordance with the present invention wherein the camera elements are arranged after an exposure has been made.
FIG. 2 is a view of a portion of the camera of FIG. 1 showing the position of the camera elements after the shutter has been cocked and preparatory to advancing film.

Referring now to FIG. 1, the camera illustrated therein includes a housing 10 into which a film cartridge 12 containing perforated roll film 14 and opaque backing paper 16 has been loaded. The film cartridge may be of the type shown in coassigned U.S. Pat. No. 3,138,081 which issued on June 23, 1964 to Hubert Nerwin, and includes take-up and supply chambers 18 and 20, respectively.

A film advance slide 22 is mounted in camera housing 10 by a pin-and-slot arrangement so as to be movable from the position shown in FIG. 1 in the direction of arrow 24. Slide 22 has an opening 26, a plurality of ratchet teeth 28, an abutment lug 30 and a second lug 32 thereon. A spring 34 urges slide 22 to the right as viewed in FIG. 1.

A shutter drive member 36 is rotatably carried on a stud 38 in housing 10 and is biased in a clockwise direction as viewed in FIG. 1 by a spring 40. An arm 42 on drive member 36 actuates a shutter, not shown, during clockwise rotation of the drive member to effect an exposure. A second arm 44 of the drive member has a cam follower 46 extending into opening 26 of slide 22 to follow, during movement of the slide in the direction of arrow 24, the cam surface which defines the opening, thereby rotating drive member 36 in a counter-clockwise direction against the force of spring 40. The function of two other arms 48 and 50 on drive member 36 will be explained hereinafter.

A rack 52, having a plurality of gear teeth 54, is slidably mounted on housing 10 and is urged by a spring 56 into contact with a stud 58 on drive member 36. Teeth 54 mesh with corresponding gear teeth on a gear sector 60, which, through gears 62 and 64, advances film from supply compartment 20 to take-up compartment 18 when rack 52 is moved to the left against the force of a spring 65. Gear sector 60 may be connected to gear 62 through a one-way clutch so that gears 62 and 64 do not turn when rack 52 is moved to the right.

Figure 3:
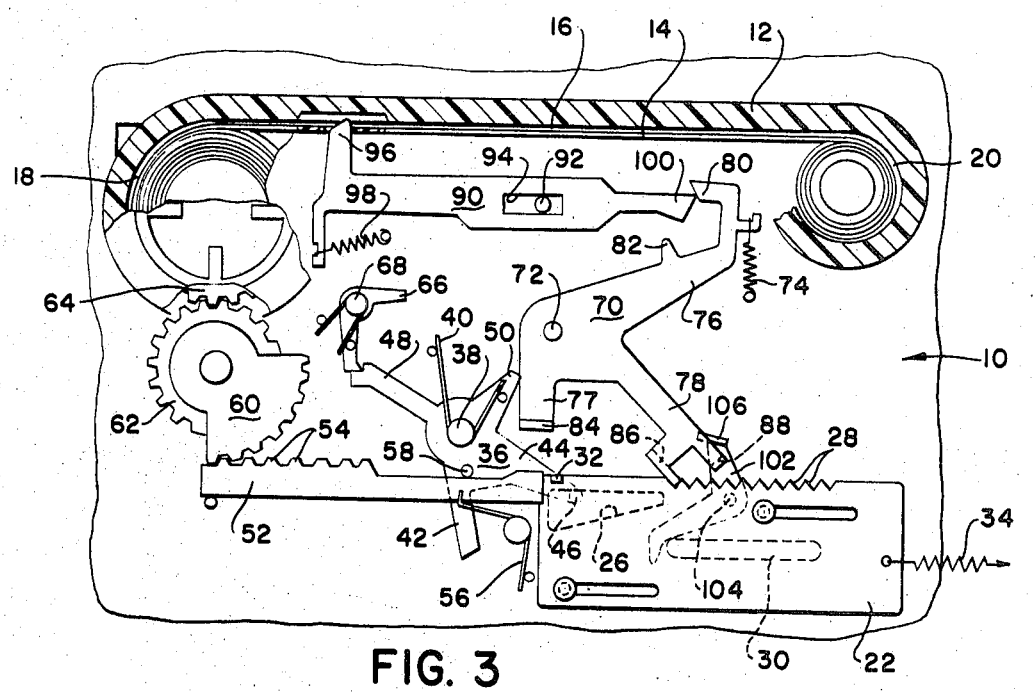
FIG. 3 is a view of a portion of the camera of FIG. 1 showing the position of the camera elements after the film has been advanced and ready to make an exposure.

A latch member 66 pivotally mounted in housing 10 on a stud 68 for movement between a latch position (retaining drive member 36 in its cocked position; FIGS. 2 and 3) and a release position (permitting spring 40 to rapidly move the drive member to its uncocked position as shown in FIG. 1).

An intermediate member 70 is rotatably carried in housing 10 on a stud 72 and is biased in a clockwise direction by a spring 74. Intermediate member 70 has three arms, 76–78; arm 76 having a pair of tabs 80 and 82, arm 77 having a tab 84 and arm 78 having a pair of tabs 86 and 88.

A film sensing member 90 is rotatably and slidably carried by a pin 92 which extends into a slot 94 in the sensing member. A film sensing pawl 96 on the sensing member extends toward film 14 and the camera's exposure plane. A spring 98 urges the sensing pawl to a film transversing position as shown in FIG. 1 and urges the sensing member to the right, or towards supply chamber 20. An abutment tab 100 is provided on the right end of sensing member 90.

A control member 102 is pivotally mounted on housing 10 by a stud 104. The upper portion of control member 102 is provided with a tab 106 positioned in the region of tab 88 on intermediate member 70. The lower portion of the control member lies in the path of tab 30 on slide 22.

OPERATION

FIG. 1 shows the camera elements positioned after an exposure had been made. The camera is now ready to be operated to cock the shutter mechanism and advance the film to the next picture frame. The operator manually moves slide 22 in the direction of arrow 24 against the force spring 34. As the slide moves, follower 46 engages the cam surface of opening 26, causing shutter drive member 36 to rotate in a counterclockwise direction against the force of spring 40 until arm 48 thereon snaps behind latch member 66. At the same time, tab 30 engages the lower portion of control member 102 to rotate the control member in a clockwise direction so that tab 106 on the control member engages tab 88 on intermediate member 70 and rotates the intermediate member in a counterclockwise direction so that tab 82 engages tab 100 of sensing member 90 to rotate the sensing member in a counterclockwise direction to withdraw sensing pawl 96 from the film perforation. Once pawl 96 is withdrawn from the perforation, spring 98 moves sensing member 90 to the right until tab 100 thereon falls beneath tab 80 on the intermediate member. Tab 106 on control member 102 passes beneath tab 88 on the intermediate member so that the lower portion of the intermediate member remains out of the path of tab 30 on slide 22; see FIG. 2.

During the first stroke of slide 22, lug 32 misses rack 52 because the rack has been held in its lower, FIG. 1 position by pin 58 on drive member 36. Therefore, during the first movement of the slide, there is no film advancement. When released, the slide is returned to the right by spring 34 and the camera elements are positioned as shown in FIG. 2, rack 52 having been raised by spring 56 into alignment with abutment 32 on the slide.

Now, on the second operation stroke of slide 22, lugs 32 on the slide moves rack 52 to the left to advance film from supply compartment 20 to take-up compartment 18 of the cartridge. As the film advances, when a perforation reaches a position of film sensing pawl 96, the pawl is moved into the perforation by spring 74 so that the sensing member is moved to the left by the advancing film.

At the moment that the next succeeding frame of film reaches the camera's exposure station, tab 100 on sensing member 90 falls off of tab 80 of intermediate member 70, enabling spring 74 to rotate the intermediate member in a clockwise direction until tab 86 on arm 78 engages ratchet teeth 28 on slide 22 to prevent further film advancement. When the operator release slide 22, it is returned to the right by spring 34. The camera elements are now positioned as shown in FIG. 3, and the camera is ready to be operated to make an exposure.

To make an exposure, latch 66 is rotated in a clockwise direction (by the camera's body release member, not shown) releasing drive lever 36 to run down in a clockwise direction from its FIG. 1 position to operate the shutter mechanism by arm 42. During such running down movement of drive member 36, its arm 50 engages tab 84 on arm 77 of intermediate member 70 to rotate the intermediate member in a counterclockwise direction, thereby removing tab 86 from ratchet teeth 28 of slide 22. At the same time, pin 58 on the drive member moves rack 52 out of alignment with abutment 32 on slide 22. Spring 98 retains sensing pawl 96 in the film perforation. The camera elements are now in their respective positions shown in FIG. 1, and the camera is ready to be operated to re-cock the shutter and advance the next succeeding film frame to the exposure station as hereinbefore described.

SECOND EMBODIMENT

In the embodiment of FIGS. 1–3, film sensing pawl 96 of sensing member 90 rests on the surface of film 14 immediately after withdrawal from the perforation. The second preferred embodiment, shown in FIG. 4, includes means for holding the sensing member after withdrawal from the perforation until commencement of the film transport. The same reference numerals as were used in the first embodiment have been used in FIG. 4 to point out identical structure.

It will be noted that a catch 110 is provided and is rotatably mounted about a stud 112. A spring 114 urges catch 110 in a counterclockwise direction and a leg 116 on the catch rest against a pin 118 on gear sector 60. A hook 120 on the catch cooperates with a tab 122 on sensing member 90.

Figure 4:
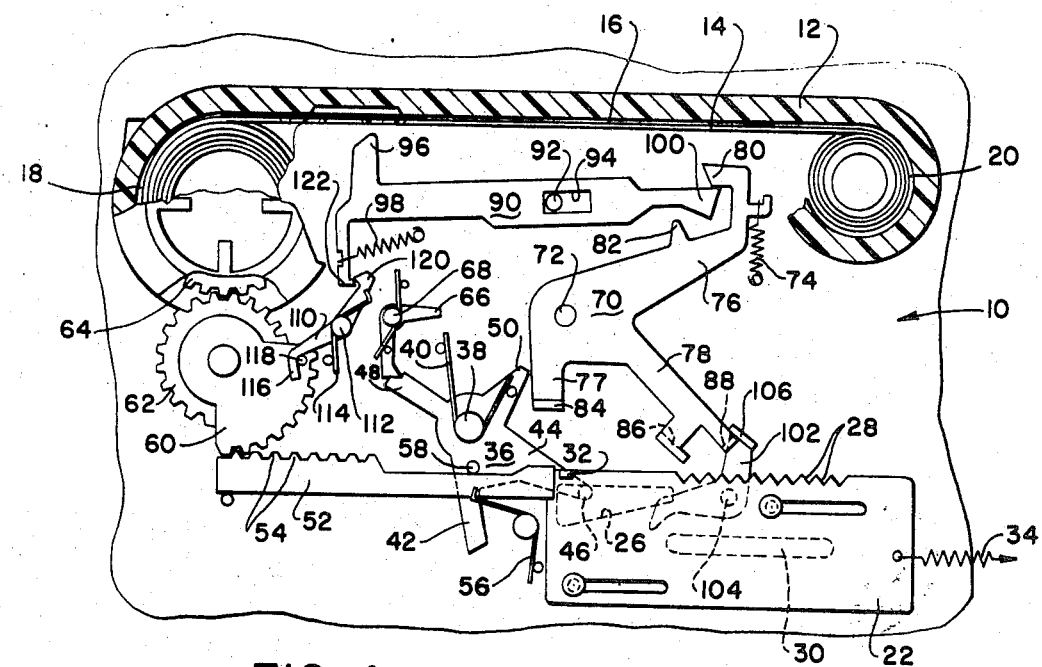
FIG. 4 is a view of a portion of a camera in accordance with a second embodiment of the present invention wherein the camera elements are arranged after the shutter has been cocked and preparatory to advancing film.

The sequence of operation of the camera shown in FIG. 4 is the same as that of the camera shown in FIGS. 1–3, differing only in that after withdrawal from a perforation of sensing pawl 96, sensing member tab 122 is hooked by catch 110 that is held away from the film. On the second operating stroke of slide 22, pin 118 rotates the catch in a clockwise direction, whereby hook 120 of the catch releases tab 122 of sensing member 90 and the sensing member is free to rotate until sensing pawl 96 engages the film surface.

THIRD EMBODIMENT

Figure 5:
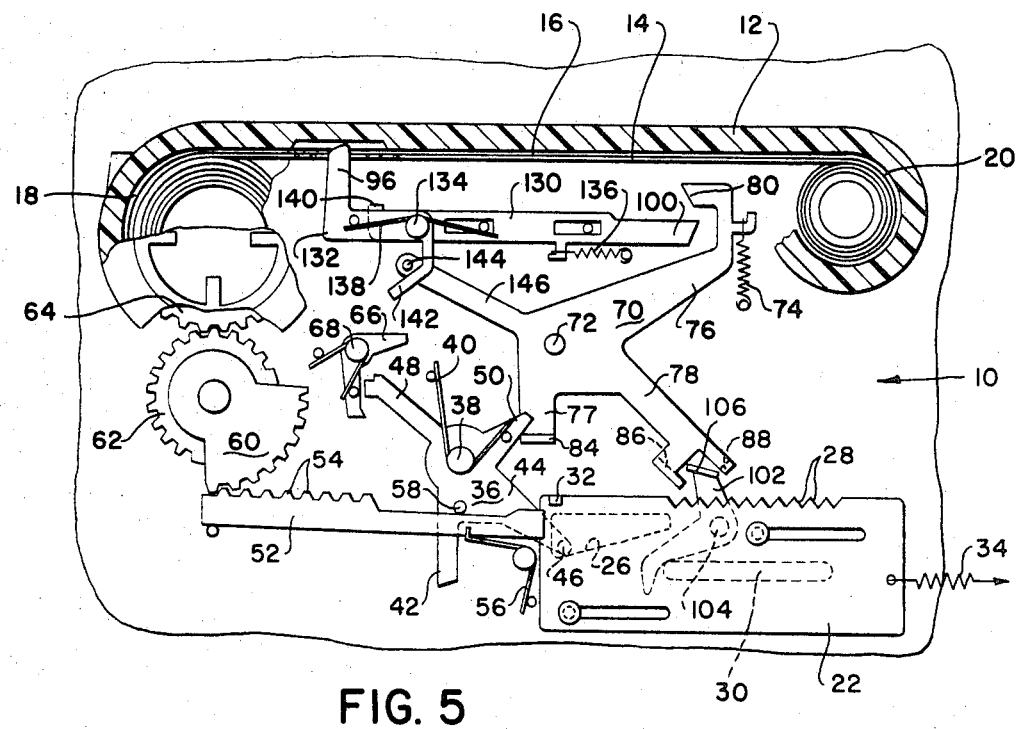
FIG. 5 is a view of a portion of a camera in accordance with a third embodiment of the present invention wherein the camera elements are arranged after an exposure has been made.

FIG. 5 shows a further embodiment of the present invention in which film sensing member 90 is formed of two parts 130 and 132 which are pivotally connected by a pin 134. Portion 130 of the sensing member is slidably mounted on housing 10 by a pin-and-slot arrangement and is biased by a spring 136 to the right. Portion 132 is acted upon by a spring 138 in a clockwise direction about pin 134. A slot tab 140 on portion 130 limits the amount of travel of portion 132. A leg 142 cooperates with a pin 144 on an arm 146 of intermediate member 70 to remove sensing pawl 96 from a film perforation upon counterclockwise rotation of the intermediate member.

The functions of the elements of the embodiment shown in FIg. 5 are the same as those of the embodiment of FIGS. 1–3 except that on the first operation stroke of slide 22, leg 142 of portion 132 is engaged by pin 144 of the intermediate member so that sensing pawl 96 is withdrawn from the perforation. Sensing member portions 130 and 132 then move to the right under the influence of spring 136.

The invention has been described in detail with particular reference to preferred embodiments, but it will be understood that variations and modifications can be effected within the spirit and scope of the invention.

We claim:

1. In a perforated roll film camera including (1) transport means for advancing film along an exposure plane, (2) a film sensing pawl movable between a retracted state on one side of said exposure plane and an extended state transversing said exposure plane, (3) metering means associated with said transport means and said sensing pawl for disabling said transport means in response to movement of said sensing pawl to a predetermined position in its extended state and (4) shutter means, movable between a cocked position and a run-down position, for effecting the exposure of a film frame at said exposure plane; the improvement comprising:

a cocking member movable through a path to move said shutter means from its run-down position to its cocked position;

means associated with said sensing pawl and said cocking member for moving said sensing pawl to its retracted state upon movement of said cocking member through said path to move said shutter means to its cocked position; and means interconnecting said cocking member and said transport means for operating said transport means to advance film upon movement of said cocking member after said sensing pawl has been moved to its retracted state.

2. In a perforated roll film camera including (1) transport means for advancing film along an exposure plane, (2) a film sensing pawl movable between a retracted state on one side of said exposure plane and an extended state transversing said exposure plane, (3) metering means associated with said transport means and said sensing pawl for disabling said transport means in response to movement of said sensing pawl to a predetermined position in its extended state and (4) shutter means, movable between a cocked position and a run-down position, for effecting the exposure of a film frame at said exposure plane; the improvement comprising:

a. a cocking member movable through a path to move said shutter means from its run-down position to its cocked position; and b. means associated with said sensing pawl and connected to said cocking member for moving said sensing pawl to its retracted state upon movement of said cocking member through said path to move said shutter means to its cocked position, said means for moving said sensing pawl to its retracted state comprising 1. an intermediate member movable from a first position to a second position, said intermediate member contacting said sensing pawl during such movement to move said sensing pawl to its retracted state, 2. spring means for urging said intermediate member toward its first position, and 3. control means, interconnecting said intermediate member and said cocking member, for moving said intermediate member from its first position to its second position upon movement of said cocking member through said path to move said shutter mechanism to its cocked position.

3. In a perforated roll film camera including (1) film transport means for advancing film along an exposure plane, (2) a film sensing pawl movable between a retracted state on one side of said exposure plane and an extended state transversing said exposure plane, and (3) metering means, associated with said transport means and said sensing pawl for disabling said transport means upon movement of said sensing pawl to a predetermined position in its extended state; the improvement comprising:

an operating member mounted on said camera for movement in at least a first direction;

first means, associated with said operating member and said sensing pawl, for moving said sensing pawl to its retracted state in response to movement of said operating member in said first direction;

second means, associated with said operating member and said film transport means, for operating said film transport means to advance film along said exposure plane in response to movement of said operating member in said first direction; and means for sequentially connecting said first means to said operating member and then connecting said second means to said operating member whereby said sensing pawl is moved to its retracted state before the film is advanced.

4. The improvement as defined in claim 3 wherein:
said operating member is reciprocally movable toward and away from a rest position;
said first associated means is connected to said operating member by said connecting means during one movement of said operating member from its rest position; and
said second associated means is connected to said operating member by said connecting means during the next movement of said operating member from its rest position.

* * * * *